April 24, 1934.   R. F. DAGNALL ET AL   1,956,494
FLOTATION GEAR FOR AIRCRAFT
Filed Oct. 25, 1933   2 Sheets-Sheet 1
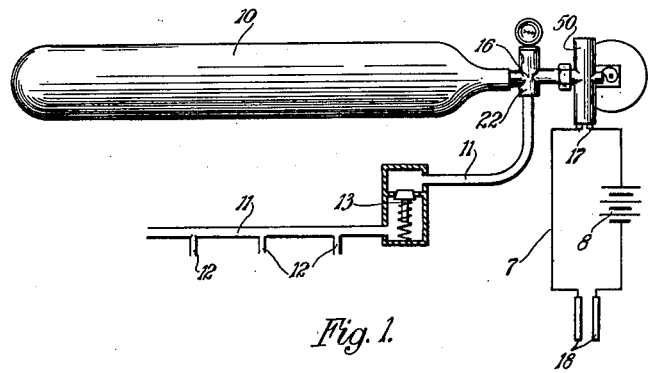
Fig. 1.
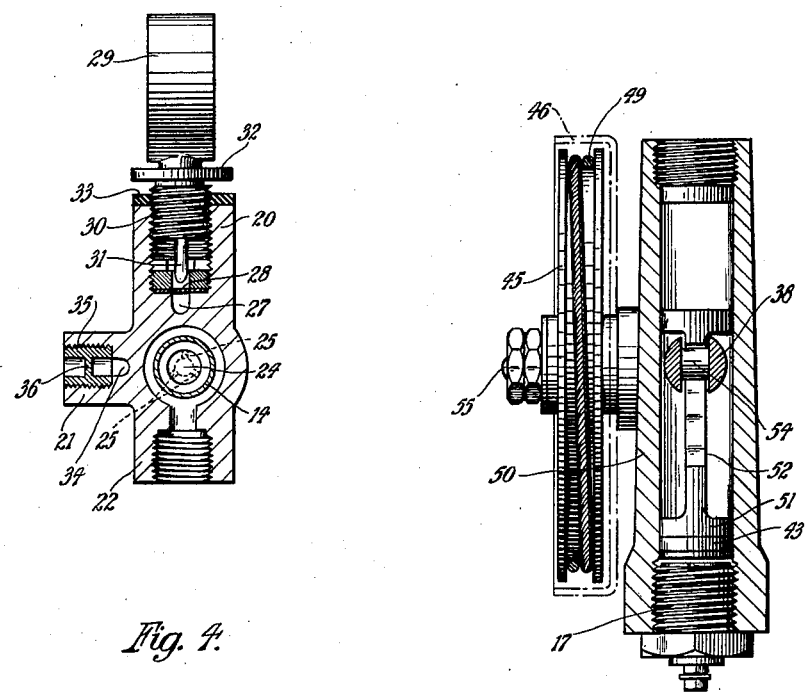
Fig. 4.
Fig. 5.
Reginald Foster Dagnall
and Alan Herbert Reffell
Inventors
By Wm. Leo Lamb Atty.

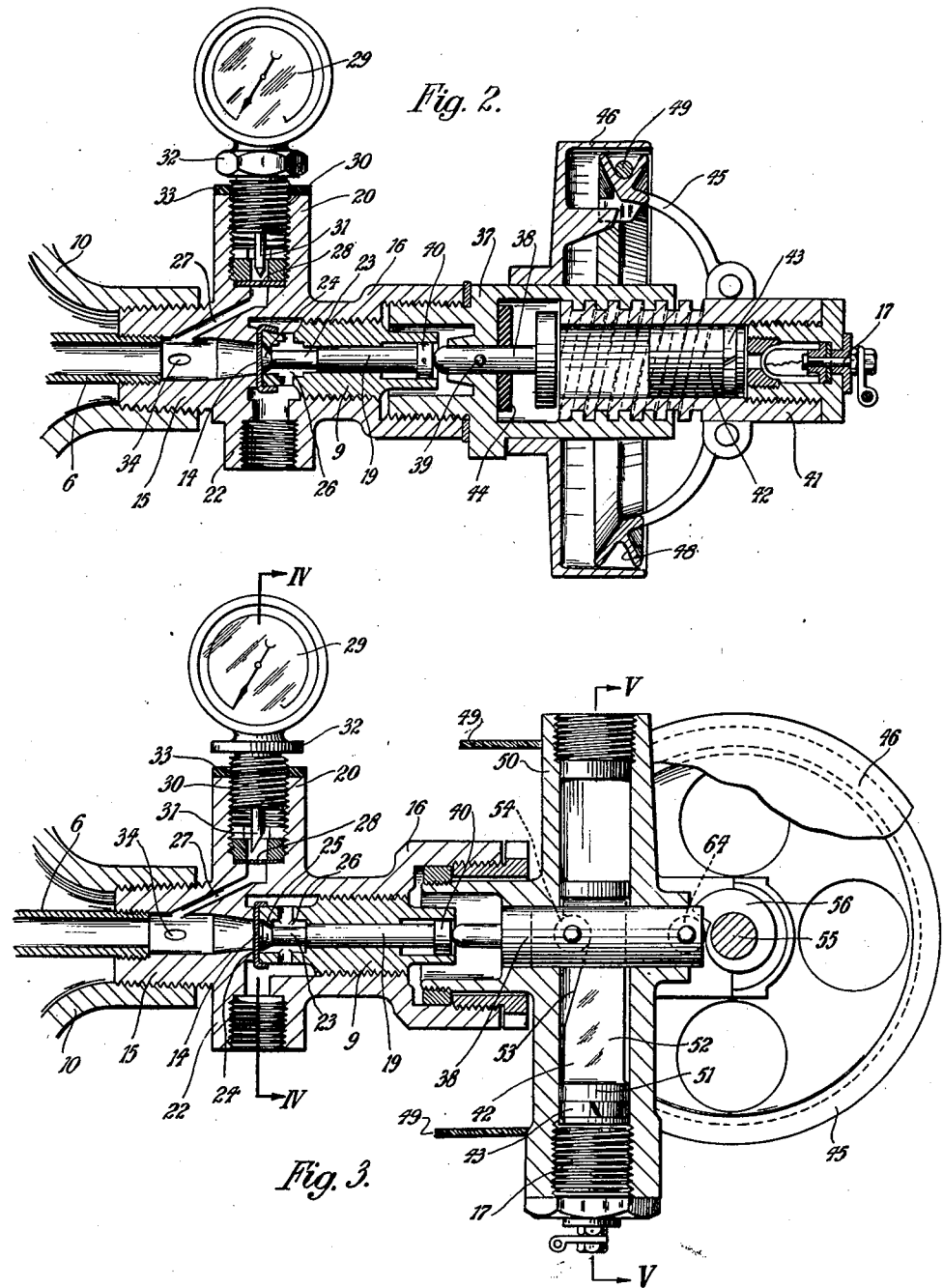

Patented Apr. 24, 1934

1,956,494

UNITED STATES PATENT OFFICE 1,956,494

FLOTATION GEAR FOR AIRCRAFT

Reginald Foster Dagnall and Alan Herbert Reffell, Guildford, England

Application October 25, 1933, Serial No. 695,198
In Great Britain November 16, 1932

10 Claims. (Cl. 244—2)

This invention relates to flotation gear for aircraft of the type comprising inflatable bags which are adapted to be inflated by the delivery to the bags of gas under pressure immediately the aircraft descends upon the water. When inflated, the bags form buoyant floats for supporting the aircraft and preventing it from sinking.

It is important that the inflation of the bags should take place immediately on the contact of the aircraft with the water but not at any considerable time before actual contact with the water, because the inflation of the bags—should it have taken place during flight—would seriously hamper the progress and control of the aircraft to which the flotation gear is applied.

The invention provides a flotation gear for aircraft of this type in which the delivery of the gas to the bags is effected automatically by the completion of an electric circuit when the aircraft descends upon the water. According to a feature of the invention the electric circuit may be interrupted by an element constituted by spaced contact plates so disposed as to be immersed when the aircraft descends upon the water, thereby completing the circuit. Conveniently, the arrangement of spaced plates can be duplicated and wired in series so as to reduce the likelihood of the circuit being completed by accidental short circuits.

The spaced plates in the circuit are exposed externally on the aircraft in such a way that when the aircraft descends on water good contact is made through the water from one plate to the other. This contact is most effective in sea water, and although less active in fresh water is sufficient to complete the circuit in most fresh waters which are not too soft in character.

According to a further feature of the invention the flotation gear may comprise a cartridge which is adapted to be fired on completion of the electric circuit and thereby to effect delivery of the gas to the inflatable bags.

In the preferred embodiment of the invention the gas (preferably carbon di-oxide in a liquid state) is contained in a pressure bottle sealed by a frangible disc and adapted to be pierced on firing of the cartridge by the impact against it of a cutter. Preferably manually operable emergency means are provided for actuating the cutter to pierce the frangible disc in case for any reason the cartridge should fail to explode when the aircraft descends upon the water. The cartridge, in the preferred embodiment of the invention, is located at one end of a cylinder containing a piston which is adapted to be driven forward when the cartridge is fired and by its impact against the cutter (directly or through an intermediate member) to cause the latter to pierce the frangible disc.

Two practical embodiments of flotation gear constructed in accordance with the present invention will now be described in detail by way of example with reference to the accompanying drawings, in which—

Fig. 1 is a diagrammatic view of the apparatus as a whole.

Fig. 2 is a longitudinal section through one form of cartridge operated apparatus for delivering gas to the bags.

Fig. 3 is a longitudinal section through an alternative construction of cartridge operated apparatus for delivering the gas.

Fig. 4 is a section along the line IV—IV in Fig. 3.

Fig. 5 is a section along the line V—V in Fig. 3.

Like reference numerals indicate like parts throughout the drawings.

Referring first of all to Fig. 1, this is a diagrammatic view illustrating the application of an electric circuit in accordance with the invention to a flotation gear in which the gas (preferably carbon di-oxide in liquid form) is stored in a pressure bottle 10. The bottle communicates with a conduit 11 which in turn communicates by branch conduits 12 to inflatable bags (not shown) which are suitably disposed on the aircraft so that, when inflated, they will support it in the water. A non-return valve 13 is located in the conduit between the bottle and the bags. The bottle is normally closed by a frangible disc 14 (see Figs. 2 and 3), which however is adapted to be pierced in the manner hereinafter described, on completion of the electric circuit 7. This circuit comprises a battery or equivalent source of current 8, a cartridge 17 and a pair of spaced plates 18 which normally constitute an element interrupting the circuit. The plates are mounted on the machine in such a position (preferably near the nose) that when the machine descends upon the water the plates 18 immediately become immersed with the result that the electric circuit is completed and the cartridge 17 fired, thereby piercing the disc 14 and allowing the gas to inflate the bags.

If desired, an additional electric circuit may be provided containing a pair of spaced plates 18 which are disposed on top of the machine and connected to the cartridge, so as to safeguard against the main circuit failing to be completed in the event of the aircraft entering the water in an up-side-down position, and the plates in the main circuit therefore not becoming immersed. Again, if desired, the arrangement of plates can be duplicated and wired in series so as to reduce the danger of the cartridge being fired owing to an accidental short circuit. The circuit may also incorporate a relay so as to increase the current through the cartridge.

It will be appreciated that although the electric circuit has been illustrated in Fig. 1 as applied to the release of compressed gas from a pressure container, it may also be applied to the inflation of the bags by chemical generation of gas. Thus, the completion of the electric circuit may be caused to bring into contact two chemical substances which are normally separated but which, when mixed, generate gas in large quantities. For example, the chemical substances may normally be separated by a vessel, formed of glass or other fragile material and containing one of the substances, which is adapted to be shattered by the discharge of the cartridge on completion of the electric circuit, thus allowing the two substances to mix and generate the gas necessary to inflate the bags.

Referring now to Figs. 2 and 3, these figures illustrate two alternative constructions of apparatus for delivering the compressed gas from the bottle 10 to the bags. In each case the portion of the apparatus comprising the closure for the bottle and illustrated on the left hand side of the figures is identical, but the actual mechanical arrangements for piercing the disc 14 are different in the two cases.

In each case the bottle 10 is sealed by means of a plug 15 forming part of a casting 16 and engaging in screw threads on the inner surface of the neck of the bottle. Into the plug 15 is threaded the sipon tube 6 which passes into the interior of the bottle.

The casting 16 is formed with three projecting bosses 20, 21 and 22 (see Fig. 4) which extend transversely to its length.

The central throughway of the casting 16 is closed by the frangible disc 14 which is maintained tightly against its seat by means of a hollow valve plug 9 which is screwed into the interior of the casting 16. Within the hollow valve plug is slidably mounted a cutter 19 which is formed with a cylindrical body 23 and a tapered head 24. The end face of the head of the cutter is flush with the end of the valve plug and acts as a support for the central portion of the frangible disc 14. The inner surface of the valve plug 9 is provided with three projections, indicated at 25 in Fig. 4, which abut against the sloping face of the cutter head and hold the latter against the disc. Owing to the fact that the disc is supported over its whole surface by the valve plug and cutter it can be made very thin and hence easy to pierce, but will nevertheless not be affected by excess pressure in the bottle. Any gas which may chance to leak between the face of the disc and its seat is able to escape to atmosphere through a slight clearance in the bore of the valve plug provided around the body of the cutter.

The boss 22 is adapted for connection with the conduit 11 leading to the bags and communicates with an annular chamber 26 within the bore of the casting 16 which is separated from the interior of the bottle by the disc 14 so that gas can only pass into the conduit 11 when the disc has been pierced. The boss 20 communicates by means of a branch pipe 27 with the bore of the plug 15 on the bottle side of the disc 14. The branch pipe 27 is however normally sealed by means of a frangible disc 28. A pressure gauge 29 formed with a screw threaded plug 30 carrying a cutter 31 is provided for use with the apparatus and is screwed into the boss 20 prior to mounting the bottle on the aircraft. When the gauge is screwed tightly home into the boss 20 the disc 28 is pierced by the cutter 31 thus placing the gauge in communication with the interior of the bottle. When the pressure gauge 29 is screwed home so as to pierce the disc 28 a gas-tight joint is formed by the flange 32 on the gauge coming into engagement with the rubber washer 33.

The boss 21 communicates with the bore of the plug 15 by means of a conduit 34. This boss is sealed by a safety nut 35 which is of H shaped cross section, the transverse portion 36 of the H constituting a sealing disc which will give way when the pressure within the bottle rises above a safe value. The nut 35 is arranged to give way (and in so doing to permit of the passage of the compressed gas from the bottle directly to atmosphere) at a pressure less than that which would be required to enable the gas to escape past the supported disc 14.

Referring now to Fig. 2 the end of the casting 16 remote from the bottle is in screw threaded engagement with a cylindrical casing 37. Within this casing is located a plunger 38 which abuts against the end of the cutter 19 and is maintained in position by means of a shearing pin 39 which prevents it from accidentally actuating the cutter. On the end of the cutter adjacent the plunger is formed a flange 40 which prevents the cutter from being driven into the bottle after it has pierced the disc 14. Into the end of the casing 37 is screwed a cylinder 41 which contains at one end the cartridge 17. A piston 42 is contained at the end of the cylinder adjacent the cartridge. The piston is normally maintained at the end of the cylinder adjacent the cartridge by reason of the fact that a piston ring 43 on the piston forms a tight fit within the bore of the cylinder 41. When the cartridge 17 is exploded by completion of the circuit 7 on immersion of the plates 18 when the aircraft descends on the water, the piston 42 is driven forward with great force by the explosion, strikes the plunger 38, thereby breaking the shearing pin 39 and driving the cutter 19 through the frangible disc 14 so that the gas is admitted from the bottle 10 to the bags. The liquid carbon di-oxide produces a large volume of gas which inflates the bags and supports the aircraft against sinking. A cushion 44 is provided for breaking the force of the blow on the plunger 38.

In order to enable the cutter to be actuated manually in case for any reason the cartridge should fail to explode when the aircraft descends upon the water, a wheel 45 is mounted on the cylinder 41. Around the wheel is disposed a shroud 46 carried on the casing 37. The wheel is formed in its periphery with a groove 48 within which rests a cord 49. If the cartridge fails to explode the pilot or other member of the crew of the aircraft may effect manual operation of the cutter by pulling upon the cord 49, thus rotating the wheel 45 and cylinder 41 so that the cylinder will be screwed into the casing 27. The pull on the cable will exert sufficient force to break the shearing pin 39 and drive the cutter through the disc 14. A spring and stop (not shown) are provided for normally maintaining the wheel in the position shown in Fig. 2, the arrangement being such that a pull on the cord will cause the wheel to rotate against the action of the spring and thereby actuate the cutter.

In the construction shown in Fig. 3 the end of the casting 16 remote from the bottle is closed by a cross-shaped casting 50. A slotted plunger 38 is slidably mounted in one limb of the casting 50 and is in alignment with and abuts against the cutter 19. The cartridge 17 is disposed in the other limb of the casting, which constitutes a cylinder containing the piston 42. As will be seen from Fig. 5, the piston comprises cylindrical end portions 51 and a flattened body portion 52 which passes through the central slot in the plunger 38. The body portion of the piston is formed with a cut-away portion 53 which abuts against a roller 54 carried on the plunger 38.

As will be readily seen from Fig. 3 when the piston 42 is driven forward by the explosion of the cartridge 17 the cam face 53 will act on the roller 54 and force the plunger to the left thereby piercing the closure 14 and releasing the gas. The manually operated auxiliary mechanism for use in case the cartridge should fail, comprises a wheel 45 operable by a cord 49 wound around its periphery. The wheel 45 is keyed to a shaft 55 on which is rigidly mounted a snail cam 56 which co-operates with a roller 64 on the plunger 38. When the cord 49 is pulled the cam 56 will act on the roller 64 so as to force the plunger 38 to the left and thereby pierce the disc 14. As in the case of the construction illustrated in Fig. 2, a suitable spring and stops (not shown) are provided for normally maintaining the wheel 45 in its inoperative position.

What we claim as our invention and desire to secure by Letters Patent is:—

1. A flotation gear for aircraft comprising in combination a plurality of inflatable bags, a source of gas for inflating the bags, an electrical circuit which is normally open but comprises an element arranged to complete the circuit when the aircraft descends upon the water, and means for effecting the delivery of the gas from the source to the bags which are operated automatically when the circuit is completed.

2. A flotation gear for aircraft comprising in combination a plurality of inflatable bags, a source of gas for inflating the bags, an electrical circuit comprising a pair of spaced plates which normally maintain the circuit open but are so disposed as to be immersed when the aircraft descends upon the water, thereby completing the circuit, and means for effecting the delivery of the gas from the source to the bags which are operated automatically when the circuit is completed.

3. A flotation gear for aircraft comprising in combination a plurality of inflatable bags, a source of gas for inflating the bags, an electrical circuit which is normally open but comprises an element arranged to complete the circuit when the aircraft descends upon the water, a cartridge arranged to be fired on completion of the circuit, and, when fired, to effect delivery of the gas from the source to the bags.

4. A flotation gear for aircraft comprising in combination a plurality of inflatable bags, a source of gas for inflating the bags, an electrical circuit comprising a pair of spaced plates which normally maintain the circuit open but are so disposed as to be immersed when the aircraft descends upon the water, thereby completing the circuit, a cartridge arranged to be fired on completion of the circuit, and, when fired, to effect delivery of the gas from the source to the bags.

5. A flotation gear for aircraft comprising in combination a plurality of inflatable bags, a pressure bottle containing gas and sealed by a frangible disc, conduit connections between the bottle and the bags, an electrical circuit which is normally open but comprises an element arranged to complete the circuit when the aircraft descends upon the water, a cartridge arranged to be fired on completion of the circuit, and a cutter which is arranged to be driven forward to pierce the frangible disc on firing of the cartridge, thereby effecting the delivery of the gas from the bottle to the bags.

6. A flotation gear for aircraft comprising in combination a plurality of inflatable bags, a pressure bottle containing gas and sealed by a frangible disc, conduit connections between the bottle and the bags, an electrical circuit comprising a pair of spaced plates which normally maintain the circuit open but are so disposed as to be immersed when the aircraft descends upon the water, thereby completing the circuit, a cartridge arranged to be fired on completion of the circuit, and a cutter which is arranged to be driven forward to pierce the frangible disc on firing of the cartridge, thereby effecting the delivery of the gas from the bottle to the bags.

7. A flotation gear for aircraft comprising in combination a plurality of inflatable bags, a pressure bottle containing gas and sealed by a frangible disc, conduit connections between the bottle and the bags, an electrical circuit which is normally open but comprises an element arranged to complete the circuit when the aircraft descends upon the water, a cartridge arranged to be fired on completion of the circuit, a cutter which is arranged to be driven forward to pierce the frangible disc on firing of the cartridge, thereby effecting the delivery of the gas from the bottle to the bags, and manually operated emergency means for actuating the cutter to pierce the frangible disc in case the cartridge fails to explode when the aircraft descends upon the water.

8. A flotation gear for aircraft comprising in combination a plurality of inflatable bags, a pressure bottle containing gas and sealed by a frangible disc, conduit connections between the bottle and the bags, an electrical circuit comprising a pair of spaced plates which normally maintain the circuit open but are so disposed as to be immersed when the aircraft descends upon the water, thereby completing the circuit, a cartridge arranged to be fired on completion of the circuit, a cutter which is arranged to be driven forward to pierce the frangible disc on firing of the cartridge, thereby effecting the delivery of the gas from the bottle to the bags, and manually operated emergency means for actuating the cutter to pierce the frangible disc in case the cartridge fails to explode when the aircraft descends upon the water.

9. A flotation gear for aircraft comprising in combination a plurality of inflatable bags, a pressure bottle containing gas and sealed by a frangible disc, conduit connections between the bottle and the bags, an electrical circuit which is normally open but comprises an element arranged to complete the circuit when the aircraft descends upon the water, a cartridge arranged to be fired on completion of the circuit, a cylinder containing the cartridge at one end, a piston disposed within the cylinder and adapted to be driven forward when the cartridge is fired, and a cutter disposed in the path of the piston and arranged to be operated to pierce the frangible disc by the impact against it of the piston, and thereby to effect the delivery of the gas from the bottle to the bags.

10. A flotation gear for aircraft comprising in combination a plurality of inflatable bags, a pressure bottle containing gas and sealed by a frangible disc, conduit connections between the bottle and the bags, an electrical circuit comprising a pair of spaced plates which normally maintain the circuit open but are so disposed as to be immersed when the aircraft descends upon the water, thereby completing the circuit, a cartridge arranged to be fired on completion of the circuit, a cylinder containing the cartridge at one end, a piston disposed within the cylinder and adapted to be driven forward when the cartridge is fired, and a cutter disposed in the path of the piston and arranged to be operated to pierce the frangible disc by the impact against it of the piston, and thereby to effect the delivery of the gas from the bottle to the bags.

REGINALD FOSTER DAGNALL.
ALAN HERBERT REFFELL.